P. W. MILLS.
Thrashing Machine.
No. 19,148.
Patented Jan. 19, 1858
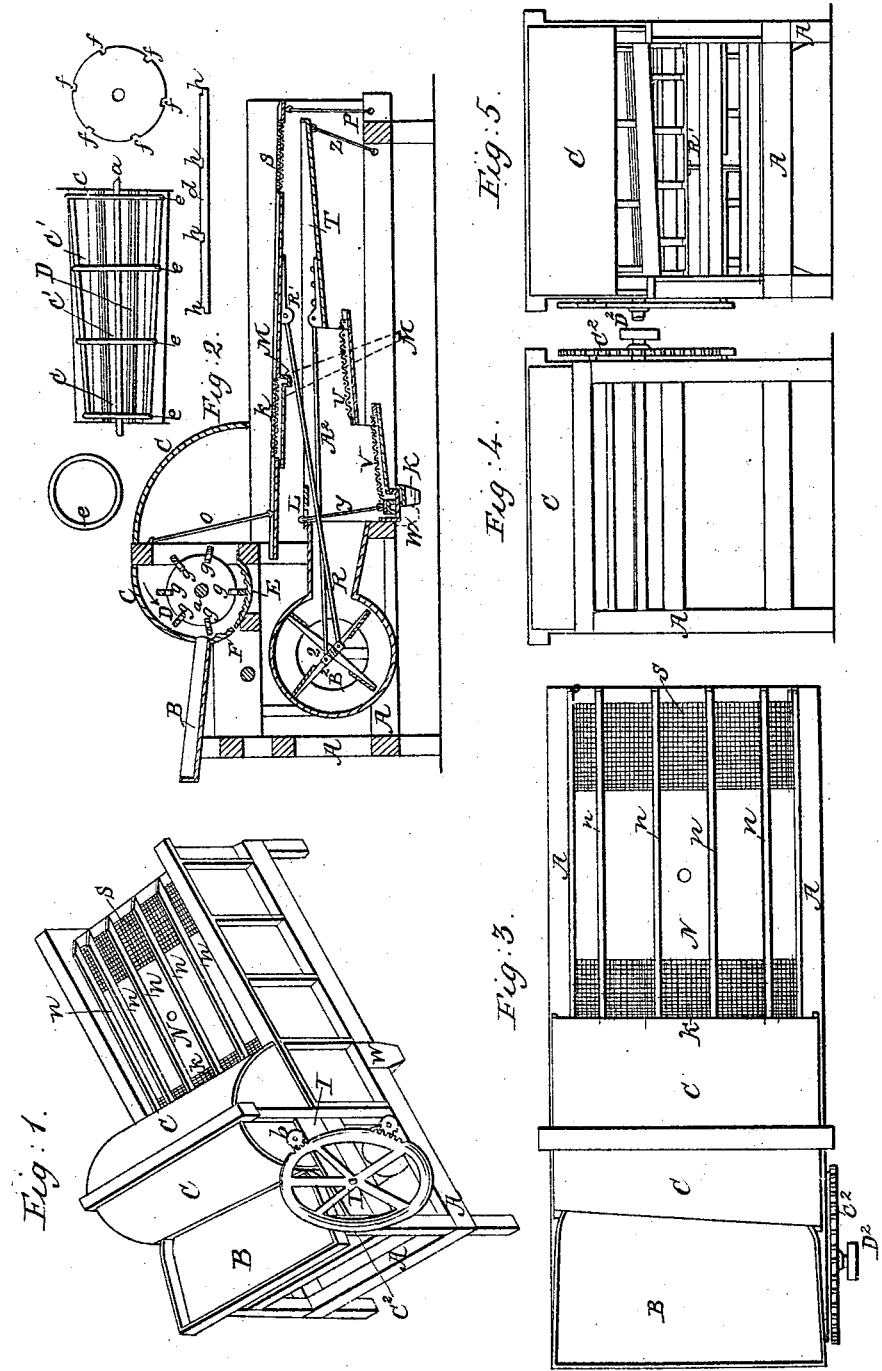

UNITED STATES PATENT OFFICE.

P. W. MILLS, OF CONNEAUT, OHIO.

THRESHING-MACHINE.

Specification forming part of Letters Patent No. 19,148, dated January 19, 1858; Reissued January 23, 1866, No. 2,155.

*To all whom it may concern:*

Be it known that I, P. W. MILLS, of Conneaut, in the county of Ashtabula and State of Ohio, have invented new and useful Improvements in the Construction of Threshing-Machines and Grain-Separators; and I do hereby declare that the following is a full and complete description of the construction and operation of the same, reference being had to the accompanying drawings, making part of this specification.

Figure 1, is a perspective view. Fig. 2, is a vertical longitudinal section, with detached parts. Fig. 3 is a top view. Fig. 4 is an end view of the front end, and Fig. 5 is an end view of the tail end of the machine.

Like letters refer to like parts.

My invention consists of a ribbed threshing cylinder, having one end of greater diameter than the other, and a corresponding concave in combination with a winnower for the purpose of threshing and winnowing grain at one operation and for delivering the straw from the tail of the screen in regular order for binding, the heads of grain and butts of the straw being conducted abreast from their entrance of the machine to their delivery.

The frame is represented in the several figures by A, A, A, &c., and may be made of scantling 3 by 4 inches or stronger, if desired, and of such proportions as to agree with the size of the other parts hereinafter named. The apron upon which the unthreshed grain is placed, and from which it is fed into the machine is represented by B, Figs. 1, 2 and 3. In the several figures, C, repsents the cap or cover to the cylinder, hereafter to be described. It is made of two parts and can be taken off and replaced at pleasure.

The cylinder D, of which two views are given in Fig. 2, is four feet in length and eighteen inches in diameter at one end, and fourteen inches at the other. It consists of a shaft $a$, upon which is a cog gear $b$ by which it is driven. There are two heads $c, c$, one at either end, placed upon the shaft, and two similar pieces or disks $c', c'$, placed upon the shaft equidistant between the two ends. Upon these parts $c, c$, and $c', c'$, are placed six or more ribs $d$, running lengthwise, and held in place by the bands $e$, in the manner hereafter described.

The heads $c, c$, and disks $c', c'$, are in size exactly corresponding to the size of the cylinder at the particular point where they are placed. They are notched as seen at $f, f$, Fig. 2, for the purpose of receiving the ribs $d$. The ribs $d$, are one and a fourth inches wide and half an inch thick; they are made of iron, and stand with their edges toward the shaft $a$. They are of sufficient length to extend from head to head, and form the length of the cylinder. Each rib is notched as seen at $h$, for the purpose of receiving the band $e$, which holds them in place, upon the heads and disks. The notches $f$, in the heads and disks $c$, and $c'$, are in depth the width of the ribs plus the thickness of the band, consequently, when the ribs are all placed in the notches $f$, the bands $e$ can be shoved to their places over the heads and disks, upon the ribs. The ribs can then be crowded out to their places by keys driven into the notches $f$, under the ribs as seen at $g$, Fig. 2. By this means, the band will settle into the notch in the edge of the rib, so that the outer surface of the rib will be just even with the outer surface of the band, for the band will rest in the notch and thus they are all held firmly in place. The bands are made of half round iron to prevent the straw from clogging under them.

The number of the ribs may be varied at pleasure, but I think eight is about the right number. The ribs may be placed parallel or in the plane of the shaft, or winding upon the surface of the cylinder. This may be corrugated or granulated. This cylinder runs in a concave E, which extends from near the lower end of the apron in the direction of the revolution of the cylinder, (which is indicated by the arrow,) for about one sixth of a circle. This concave is as long as the cylinder, and is ribbed, corrugated, or granulated. I prefer the ribs. These should be about three eighths of an inch thick, and one inch wide, in the form of a right angle triangle, with the acute angle toward the passing grain; or they may be made square. In either case, they may be laid straight in the concave or spirally, and secured by screws, or otherwise.

An adjustable concave F, constructed like the one already described, is attached to the apron B, to be used in case of necessity, when the grain is damp, or when it threshes hard. In ordinary use, this will not be needed, and may be set back a little from the cylinder, by moving the apron.

The main concave E may be made with open bars, but in this case, a tight floor must be placed beneath, to prevent the grain from falling through the machine before it is separated from the chaff.

For the purpose of guarding against accident, by the introduction of solid substances like sticks or stones, with the grain; and also, for the purpose of setting the cylinder sufficiently close to the concave, the cylinder boxes are attached to loose beams I, Fig. 1, secured at the end farthest from the cylinder by a short tenon, and having at the other end upon which the cylinder boxes rest, set screws, by which the distance between the cylinder and the concave, can be adjusted allowing at the same time, the cylinder to rise an inch or two, in case of necessity, to let a solid body pass through. The same effect might also be produced by placing the concave upon springs.

My separator consists in a new arrangement of screens in connection with a fan wheel, or blower. Next to the cylinder, in the direction of the passing grain, I place a fine screen K, which separates the grass-seed. A small portion of air from the blower, passing through the aperture L, is sufficient to separate the dust and fine chaff, from the grass seed, the seed being collected upon the floor placed immediately below the screen, collected and delivered by the spout M, M, under the machine at one side.

When unthreshed grain enters the machine it lies upon the apron B, in the position indicated by the red lines which represent the stalks of grain, that is, in a direction parallel to the ribs upon the cylinder. The grain is fed into the machine from bundles as follows. The butt end of the grain is placed near the large end of the cylinder and the heads of grain at the small end of said cylinder with the stalks nearly parallel to the ribs of the cylinder, as represented in red lines above the apron B. Now the effect of the large end of the cylinder is to sweep forward the larger amount of straw in the butt end of the bundle so as to keep the heads of grain and butts of the straw moving abreast from their entrance to the machine until they escape at the tail of the screen. Another advantage of having the cylinder larger at one end than at the other is to scatter the butts of the straw and thus allow the cylinder more perfect action upon the heads of grain. With common cylinders the butts of the straw prevent the cylinder from pressing freely on the heads because the quantity of straw and heads is small and does not fill the space between the cylinder and concave. Moreover the old machines strike the head at a disadvantage by working lengthwise of the butt and heads. My machine strikes the hull crosswise and carries the whole head and also the stalk of grain upon the ridge of the ribs at the same time. As both ends of the straw are delivered to my screen N, simultaneously the agitation of the screen carries both ends of the straw forward to be delivered at the same moment and in nearly parallel lines.

The screen board N, is of sufficient length, to reach from the concave E, to the tail end of the machine, and is suspended at the forward end by two wires or rods, hung on pins or hooks, as seen at O, Fig. 2, there being one rod upon each side. The tail end of this screen board is lower than the opposite end, to facilitate the discharge of the grain and straw, and is supported upon two rods P, placed underneath, and resting upon pins, thus allowing the screen board to vibrate backward and forward. This vibration is produced by a crank upon the fan wheel shaft, Q, and the connecting rod R, Fig. 2, which is attached to the screen board at R'. Upon the upper side of the screen board N, are placed four or more small bars n, which serve the purpose of keeping the straw above the board, thus allowing the grain to separate from the straw.

In consequence of the quick vibrating motion given to the screen board by the crank and connecting rod R, the straw and grain is shaken and thrown toward the tail end of the machine; the straw is delivered straight and in good condition for binding.

The grass seed, as before stated, falls through the fine screen K, the grain passing along the screen board, till it reaches the coarse screen S, where it drops through upon the lower screen board. In its passage from the upper to the lower screen board, it meets, or rather passes through the current of air caused by the fan wheel, and parts with most of its chaff. The grain, as it passes through the screen S, falls upon the lower screen board T, which descends toward the middle of the machine. This screen board is divided into three ledges or shelves, T, U, V, all descending toward the center of the machine. The highest (T,) of that upon which the grain first falls is tight and smooth. The second, U, is covered with a wire screen, having a tight floor below, leaving a space of an inch or more. This screen has long narrow meshes, and is designated to separate the chess from the wheat. The third part V, is arranged in like manner. This screen is composed of square meshes, and separates the cockle and other foul matter of this form from the wheat, which is delivered at the spout W, while the tares are delivered at the spout H.

The chaff and dust that is not separated by the upper current of air, is carried away by the current below, as the grain falls from T to U, and from U, to V. This lower screen board T, U, V, is suspended at the end marked V, by the rods Y, in the same manner, as is the upper one, and the end marked T, is supported by the rods L, placed underneath, as in the upper screen. A vibration is given to this screen board by means of a crank and connecting rod A² upon the shaft of the fan wheel, the arm of this crank lying in the same plane as does the crank that drives the upper screen board, so that the dead centers and live centers of both cranks in their revolutions, shall occur at the same time respectively, that is, when the upper screen board has moved its greatest distance from the crank shaft, the lower screen board will be at its nearest point, in other words, the two screen boards move in opposite directions continually. By this arrangement, the shaking and vibration of the machine, that would result from the movement of both screen boards in the same direction at the same moment, is neutralized. The machine is kept from swaying, and is driven with less power.

The fan wheel, B², is constructed in the usual form, and is put in motion by the cog wheel C². The shaft of this wheel is driven by a band upon the pulley D².

Some of the advantages of my machine are as follows: 1st. The straw being placed to the cylinder lengthwise, it passes through and is delivered in the same manner, and is consequently straight and in good order for binding. 2nd. The grain is not broken or bruised. 3rd. It makes but little dust compared with other machines, and hence is not so destructive to the lives and health of operators. 4th. It requires but little more than one half the power to drive it. 5th. In threshing barley, the beard is entirely broken off, while it is but partially done by other machines. 6th. It is an efficient and rapid cornsheller, needing only the separation of the cylinder and concave, to let the cobs pass through.

I am aware that ribbed cylinders and concaves have been used in threshing grain, and also that threshers and winnowers have been united in the same machine, but

What I claim and desire to secure by Letters Patents of the United States is,

The ribbed cylinder D, having one end of greater diameter than the other, with the corresponding concave E, when employed in connection with the winnower provided with the screen N, for the purpose of threshing and winnowing grain, and delivering the straw at the tail-end of the machine in regular order for binding, as set forth.

P. W. MILLS.

Witnesses:
P. B. Doty,
D. C. Allen.

[First printed 1911.]